United States Patent
Puttagunta et al.

(10) Patent No.: US 10,841,375 B2
(45) Date of Patent: Nov. 17, 2020

(54) PROTOCOL AGNOSTIC STORAGE ACCESS IN A SOFTWARE DEFINED NETWORK TOPOLOGY

(71) Applicant: Hewlett Packard Enterprise Development LP, Houston, TX (US)

(72) Inventors: Krishna Puttagunta, Rocklin, CA (US); Satyaprakash Rao, Shrewsbury, MA (US); Rupin T. Mohan, Northborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 905 days.

(21) Appl. No.: 15/032,982

(22) PCT Filed: Nov. 1, 2013

(86) PCT No.: PCT/US2013/068073
§ 371 (c)(1),
(2) Date: Apr. 28, 2016

(87) PCT Pub. No.: WO2015/065476
PCT Pub. Date: May 7, 2015

(65) Prior Publication Data
US 2016/0285972 A1    Sep. 29, 2016

(51) Int. Cl.
*G06F 15/16* (2006.01)
*H04L 29/08* (2006.01)
(Continued)

(52) U.S. Cl.
CPC .......... *H04L 67/1097* (2013.01); *H04L 45/38* (2013.01); *H04L 45/42* (2013.01);
(Continued)

(58) Field of Classification Search
CPC ..... H04L 67/1097; H04L 45/38; H04L 45/42; H04L 45/566; H04L 45/745; H04L 67/32; H04L 67/34
(Continued)

(56) References Cited

U.S. PATENT DOCUMENTS

| 6,778,531 B1 | 8/2004 | Kodialam et al. |
| 6,944,150 B1 | 9/2005 | McConnell et al. |

(Continued)

FOREIGN PATENT DOCUMENTS

| CN | 102483702 A | 5/2012 |
| IN | 00131CH2011 | 10/2012 |

(Continued)

OTHER PUBLICATIONS

Cai, Y. et al., Survey on Converged Data Center Networks with DCB and FCoE: Standards and Protocols, (Research Paper), Jul.-Aug. 2013, vol. 27, No. 4.

(Continued)

*Primary Examiner* — Oscar A Louie
*Assistant Examiner* — Oluwatosin M Gidado
(74) *Attorney, Agent, or Firm* — Trop, Pruner & Hu, P.C.

(57) ABSTRACT

Example embodiments relate to protocol agnostic storage access with a software defined network (SDN). A method may include receiving, at a SDN enabled switch, an initialization packet to access a storage volume. The method may include determining, at the SDN enabled switch, a storage protocol used by the initialization packet, adding a protocol tag indicative of the storage protocol to the initialization packet, and sending the initialization packet to a SDN controller. The method may include identifying, at the SDN controller, a storage application based on the protocol tag and sending the initialization packet to the storage application. The storage application may be one of a plurality of (Continued)

storage applications, each associated with a different storage protocol. The method may include performing, by the storage application, protocol-specific tasks.

20 Claims, 5 Drawing Sheets

(51) Int. Cl.
*H04L 12/721* (2013.01)
*H04L 12/717* (2013.01)
*H04L 12/741* (2013.01)
*H04L 12/715* (2013.01)

(52) U.S. Cl.
CPC .......... *H04L 45/566* (2013.01); *H04L 45/745* (2013.01); *H04L 67/32* (2013.01); *H04L 67/34* (2013.01); *H04L 45/64* (2013.01)

(58) Field of Classification Search
USPC ........................................................ 709/220
See application file for complete search history.

(56) References Cited

U.S. PATENT DOCUMENTS

| | | | |
|---|---|---|---|
| 7,464,184 B2 | 12/2008 | Shiga et al. | |
| 7,558,219 B1 | 7/2009 | Aggarwal et al. | |
| 7,852,841 B2 | 12/2010 | Wijnands et al. | |
| 7,925,778 B1 | 4/2011 | Wijnands et al. | |
| 8,230,085 B2 | 7/2012 | Roa | |
| 8,619,774 B2 | 12/2013 | Nalawade | |
| 8,638,789 B1 | 1/2014 | Pani | |
| 9,268,652 B1* | 2/2016 | Salyers | G06F 11/1464 |
| 2003/0023896 A1 | 1/2003 | Kashyap | |
| 2004/0081196 A1 | 4/2004 | Elliott | |
| 2005/0053073 A1 | 3/2005 | Kloth et al. | |
| 2005/0091353 A1 | 4/2005 | Gopisetty et al. | |
| 2006/0109850 A1 | 5/2006 | Otani et al. | |
| 2006/0114903 A1 | 6/2006 | Duffy et al. | |
| 2006/0136570 A1* | 6/2006 | Pandya | H04L 63/20 709/217 |
| 2007/0104194 A1 | 5/2007 | Wijnands et al. | |
| 2007/0112931 A1 | 5/2007 | Kuik et al. | |
| 2008/0028163 A1* | 1/2008 | Woods | G06F 3/0605 711/154 |
| 2009/0161678 A1* | 6/2009 | Huang | H04L 12/2838 370/395.5 |
| 2010/0023937 A1 | 1/2010 | Kothari et al. | |
| 2010/0061383 A1 | 3/2010 | Rupanagunta et al. | |
| 2010/0115099 A1 | 5/2010 | Gu et al. | |
| 2010/0142529 A1 | 6/2010 | Huang et al. | |
| 2010/0251269 A1 | 9/2010 | Remmert | |
| 2010/0251335 A1 | 9/2010 | Srisuresh et al. | |
| 2011/0004876 A1 | 1/2011 | Wu et al. | |
| 2011/0093251 A1 | 4/2011 | Belgaied | |
| 2011/0185089 A1 | 7/2011 | El et al. | |
| 2011/0191637 A1 | 8/2011 | Wight et al. | |
| 2012/0106558 A1 | 5/2012 | Dickens et al. | |
| 2012/0159607 A1 | 6/2012 | Vikki et al. | |
| 2012/0163427 A1 | 6/2012 | Kim | |
| 2012/0177039 A1 | 7/2012 | Berman | |
| 2012/0182992 A1 | 7/2012 | Cowart | |
| 2012/0239652 A1 | 9/2012 | Wood et al. | |
| 2012/0254353 A1 | 10/2012 | Baba et al. | |
| 2013/0021942 A1 | 1/2013 | Bacthu et al. | |
| 2013/0028135 A1 | 1/2013 | Berman | |
| 2013/0125124 A1 | 5/2013 | Kempf et al. | |
| 2013/0163427 A1 | 6/2013 | Ludovic et al. | |
| 2013/0223451 A1 | 8/2013 | Zur et al. | |
| 2013/0266007 A1 | 10/2013 | Kumbhare et al. | |
| 2013/0287026 A1 | 10/2013 | Davie | |
| 2013/0329743 A1 | 12/2013 | Gai et al. | |
| 2014/0052877 A1 | 2/2014 | Mao | |
| 2014/0112192 A1 | 4/2014 | Chou et al. | |
| 2014/0112344 A1 | 4/2014 | Mineshita | |
| 2014/0115579 A1 | 4/2014 | Kong | |
| 2014/0115705 A1 | 4/2014 | Fujishima et al. | |
| 2014/0189074 A1 | 7/2014 | Parker | |
| 2014/0254373 A1 | 9/2014 | Varma | |
| 2014/0280791 A1* | 9/2014 | DeCusatis | H04L 69/22 709/220 |
| 2014/0280838 A1* | 9/2014 | Finn | H04L 49/00 709/223 |
| 2014/0376367 A1 | 12/2014 | Jain et al. | |
| 2015/0117455 A1* | 4/2015 | Umesh | H04L 45/38 370/392 |
| 2015/0172070 A1* | 6/2015 | Csaszar | H04L 12/1863 370/218 |
| 2016/0205071 A1* | 7/2016 | Cooper | H04L 12/6418 726/1 |
| 2016/0285972 A1 | 9/2016 | Puttagunta et al. | |
| 2016/0337164 A1 | 11/2016 | Klaedtke et al. | |
| 2017/0034008 A1 | 2/2017 | Puttagunta et al. | |
| 2017/0155599 A1 | 6/2017 | Vobbilisetty et al. | |
| 2017/0295061 A1* | 10/2017 | Wittenschlaeger | G06F 9/54 |
| 2018/0006929 A1* | 1/2018 | Chou | H04L 41/042 |
| 2018/0287902 A1 | 10/2018 | Chitalia et al. | |

FOREIGN PATENT DOCUMENTS

| | | |
|---|---|---|
| WO | WO-2012173172 | 12/2012 |
| WO | 2013/139298 A1 | 9/2013 |
| WO | 2013/165340 A1 | 11/2013 |
| WO | 2014/041550 A1 | 3/2014 |
| WO | 2015/014187 A1 | 2/2015 |
| WO | 2015/065476 A1 | 5/2015 |
| WO | 2015/141487 A1 | 9/2015 |

OTHER PUBLICATIONS

PCT Search Report/Written Opinion ~ Application No. PCT/US2013/068073 dated Jun. 27, 2014 ~ 9 pages.
SDN Data Center Case Study: Using Openflow for Converged Storage, (Web Page), May 7, 2013.
SwitchX®-2 Ethernet Optimized for SDN, (Research Paper), Apr. 25, 2011.
Extended European Search Report received in EP Application No. 13896685.8, dated Jul. 6, 2017, 6 pages.
Melianox Technologies, "SwitchX®-2 Ethernet Optimized for SDN," Apr. 25, 2013, Product Brief, <http://www.mellanox.com/related-docs/prod_silicon/SwitchX-2_EN_SDN.pdf>.
Open Networking Foundation, "OpenHow Switch Specification," Version 1.4.0, Oct. 14, 2013, 205 pages, https://www.opennetworking.org/images/stories/downloads/sdn-resources/onf-specifications/openflow/openflow-spec-v1.4.0.pdf.
Rivka Gewirtz Little, "SDN data center case study: Using OpenFlow for converged storage," May 7, 2013, SearchSDN.com, <http:/searchsdn.techtarget.com/news/2240183598/SDN-data-center-case-study-Using-OpenFlow-for-converged-storage?vgnextfmt=print>.
Hewlett-Packard Development Company, L,P., "Realizing the power of SDN with HP Virtual Application Networks", Oct. 2012, 10 pages.
Wikipedia, "Multiprotocol Label Switching," Oct. 29, 2013, 5 pages. <https://en.wikipedia.oro/w/index.php?title=Multiprotocol_Label_Switching&oldid=579274534>.
Suba Varadarajan, "virtual local area networks", Aug. 14, 1997, www.cse.wustl.edu.
Singla, A. et al., "OpenContrail Architecture Document," (Research Paper), Nov. 3, 2014, 37 pages, available at http://www.opencontrail.org/opencontrail-architecture-documentation/.
Juniper Networks, "QFabric System," (Research Paper), Data Sheet, Oct. 2013, 11 pages, available at http://www.juniper.net/us/en/local/pdf/datasheets/1000393-en.pdf.
Jeda Networks, "Virtualizing the SAN with Software Defined Storage Networks," (Research Paper), Mar. 11, 2014, 6 pages, available at http://www.jedanetworks.com/wp-content/uploads/2014/03/140226-wp-Virtualizing-SDSN-FINAL.pdf.

(56) References Cited

OTHER PUBLICATIONS

International Search Report and Written Opinion received in PCT Application No. PCT/US2014/063554, dated Jun. 4, 2015, 15 pages.
International Search Report and Written Opinion received in PCT Application No. PCT/US2014/054774, dated May 21, 2015, 9 pages.
International Search Report and Written Opinion received in PCT Application No. PCT/US2014/035805, dated Jan. 21, 2015, 10 pages.
International Search Report and Written Opinion received for PCT Patent Application No. PCT/US2015/018000, dated Dec. 21, 2015, 11 pages.
International Preliminary Report on Patentability received for PCT Patent Application No. PCT/US2015/018000, dated Sep. 8, 2017, 10 pages.
International Preliminary Report on Patentability received for PCT Patent Application No. PCT/US2013/068073, dated May 12, 2016, 6 pages.
Gupta, L., "SDN: Development, Adoption and Research Trends," (Research Paper), Dec. 20, 2013, 10 pages, available at http://www.cse.wustl.edu/~jain/cse570-13/ftp/sdn/index.html.
Dixon, C. et al., "Software Defined Networking to Support the Software Defined Environment," (Research Paper), Mar./May 2014, 14 pages, available at http://rboutaba.cs.uwaterloo.ca/Courses/CS856-F14/Papers/06798742.pdf.
Cisco, "iSCSI Configuration," (Web Page), Part 3, Chapter 20, Cisco MDS 9000 Family Fabric Manager Configuration Guide, Release 2.x, copyright 1992-2016, available at http://www.cisco.com/en/US/docs/storage/san_switches/mds9000/sw/rel_2_x/fm/configuration/guide/iscsi.html#wp1672970.
Chaitanya et al., "Design, Implementation and Evaluation of Security in iSCSI-based Network Storage Systems," (Research Paper), Proceedings of the Second ACM Workshop on Storage Security and Survivability, Oct. 30, 2006, 12 pages.
Casado, M. et al., "Abstractions for Software-defined Networks," (Research Paper), Oct. 9, 21014, 8 pages, available at http://cacm.acm.org/magazines/2014/10/178789-abstractions-for-software-defined-networks/fulltext.
Big Switch Networks, Inc., "Big Cloud Fabric 2.0," (Web Page), Oct. 7, 2014, 9 pages, available at http://www.bigswitch.com/sites/default/files/sdnresources/bigcloudfabricver2.0datasheet.pdf.
Beck, P. et al., "IBM and Cisco Together for a World Class Data Center," (Research Paper), Jul. 2013, 654 pages, available at http://www.redbooks.ibm.com/redbooks/pdfs/sg248105.pdf.
Alba et al., "Efficient and Agile Storage Management in Software Defined Environments," (Research Paper), IBM Journal of Research and Development, vol. 58, No. 2/3, 2014, 12 pages, available at http://rboutaba.cs.uwaterloo.ca/Courses/CS856-F14/Papers/06798748.pdf.

\* cited by examiner

/* PROTOCOL AGNOSTIC STORAGE ACCESS IN A SOFTWARE DEFINED NETWORK TOPOLOGY */

PROTOCOL AGNOSTIC STORAGE ACCESS IN A SOFTWARE DEFINED NETWORK TOPOLOGY

CROSS-REFERENCE TO RELATED APPLICATION

Pursuant to 35 U.S.C. 0 371,this application is a United States National Stage Application of International Patent Application No. PCT/US2013/068073, filed on Nov. 1, 2013, the contents of which are incorporated by reference as if set forth in their entirety herein.

BACKGROUND

Software defined networking or a software defined network (SDN) refers to a networking topology that allows for decoupling between the system that makes decisions about where network traffic is sent (e.g., the control plane) and the underlying networking infrastructure (e.g., switches, also referred to as the data plane) that actually forwards the traffic. For example, an SDN controller may make intelligent decisions about where traffic is sent (e.g., an optimal network path) and may configure the switches (e.g., SDN enabled switches) to cause packets to flow in the determined manner. A SDN controller may be a software application that has access (e.g., Ethernet connectivity) to a plurality of switches that it controls. A SDN controller may communicate with switches via a protocol (e.g., OpenFlow) or API that allows the SDN controller to indicate to the switches where to send packets.

The term "network orchestration" may refer to a computing project or framework to provide infrastructure as a service (IaaS). For such projects (e.g., OpenStack), a network orchestrator (also referred to as an "orchestration tool") may provide (e.g., as abstractions) various resources in a datacenter to clients, resources such as processing, networking and storage. The network orchestrator may provide a dashboard of sorts to clients (e.g., administrators) that allows the clients to provision, set up and manage infrastructure resources, e.g., through a web interface. In some networking topologies, a network orchestrator may run on top of a SDN controller, which may provide abstraction and control of networking resources to the network orchestrator.

BRIEF DESCRIPTION OF THE DRAWINGS

The following detailed description references the drawings, wherein.

DETAILED DESCRIPTION

Some network orchestrators (e.g., OpenStack) may handle storage resources and networking resources independently. For example, an orchestrator may handle (e.g., using different software modules) provisioning and management of storage independently from provisioning and management of networking infrastructure. This may be because, traditionally, one communication fabric (e.g., Ethernet) was used for carrying network traffic (e.g., between servers) and other communication fabrics (e.g., Fibre Channel, SCSI, etc.) were used to carry data in storage area networks (SANS).

Ethernet based storage is becoming more common, for example, with Fibre Chanel over Ethernet (FCoE) and iSCSI protocols and data center bridge (DCB) switches. FCoE and iSCSI protocols essentially encapsulate storage protocol packets or frames within in Ethernet packets or frames. DCB refers to a set of enhancements to Ethernet local area networks for use in data center environments. Yet, even with storage protocols converging with networking protocols, some network orchestrators still handle storage resources and networking resources independently. Hence, there is a disconnect between some network orchestrators and some Ethernet based storage deployments, which may be preventing an efficient single converged fabric in data centers for storage and networking. Even if some network orchestrators handled storage resources via an Ethernet protocol, network administrators may still need to decide on a particular Ethernet storage protocol (e.g., FCoE), which means that in order for clients to access storage resources, the client may have to use the chosen storage protocol.

The present disclosure describes protocol agnostic storage access in a software defined network topology. The present disclosure may describe a number of software defined network (SDN) enabled switches that may each determine storage protocols used by incoming initialization packets and may add protocol tags indicative of the storage protocols to the initialization packets. A particular SDN enabled switch may send a received and tagged initialization packet to a SDN controller. The SDN controller may identify a storage application based on the protocol tag and may send the initialization packet to the storage application. The storage application may be one of a plurality of storage applications, each associated with a different storage protocol. The storage application may perform protocol-specific tasks, and may then indicate to the SDN controller how the SDN controller should configure the SDN enabled switches such that subsequent packets associated with the storage protocol are routed appropriately. As will be described in more detail below, the present disclosure discloses bidirectional communication between different layers (e.g., infrastructure layer 120 and control layer 110) of a storage topology (e.g., 100 of FIG. 1). Thus, not only does the present disclosure provide Ethernet based storage support, but it also provides protocol agnostic storage support. The present disclosure describes taking advantage of flexibility offered by a software defined network in order to perform protocol-specific tasks in various protocol-specific storage applications. The present disclosure describes utilizing a northbound API to deploy these protocol-specific applications.

Figure 1:
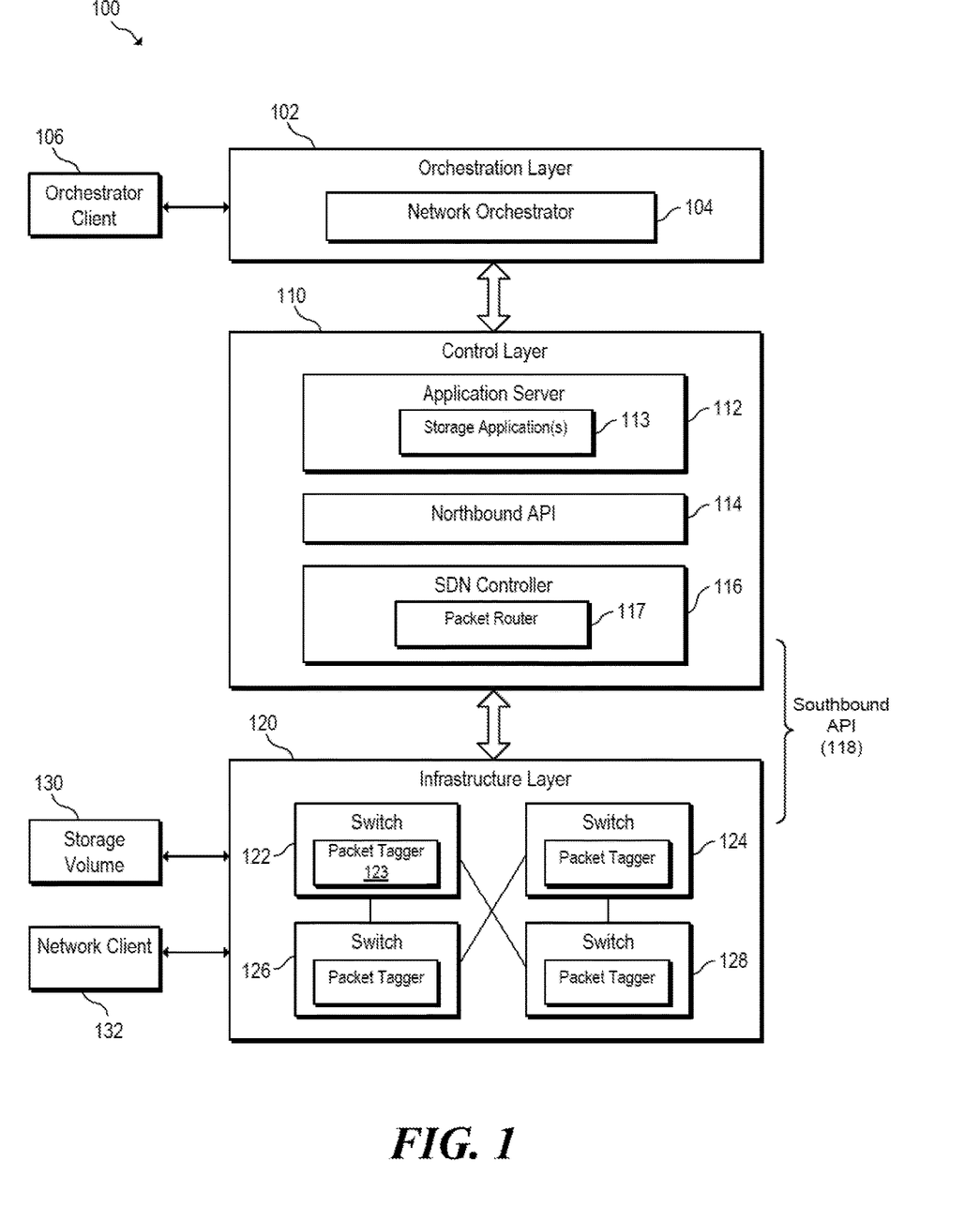
FIG. 1 is a block diagram of an example networking topology that facilitates protocol agnostic storage access with a software defined network.

FIG. 1 is a block diagram of an example networking topology 100 that facilitates protocol agnostic storage access with a software defined network (SDN). Network topology 100 may be an arrangement of physical computing elements (e.g., network infrastructure elements, network control elements and network orchestration elements). Networking topology 100 may be thought of as having multiple layers, where, in general, lower layers (e.g., layers near the bottom of FIG. 1) may provide abstraction and/or support for higher layers (e.g., layers near the top of FIG. 1). Networking topology 100 may include an infrastructure layer 120, a control layer 110, and an orchestration layer. Each of these layers may represent at least one actual computing device or may just be used as a label to refer to multiple components of the layer. The term "network system" may also be used to refer to a network topology, for example, network topology 100.

Infrastructure layer 120 may include a plurality of switches, for example, switches 122, 124, 126, 128. These switches may be data center bridge (DCB) switches that may be capable of handling FCoE and iSCSI protocols, for example. In some examples, other switches that handle yet other protocols may be used. Switches 122, 124, 126, 128 may be SDN enabled switches, e.g., switches that are capable of accepting control signals from an SDN controller, which may cause these switches to route packets in a manner specified by the control signals. Even though FIG. 1 shows four total switches, it should be understood that in various examples, infrastructure layer 120 may include more or less switches. Additionally, even though the term "switch" is used in this disclosure and shown in FIG. 1, the switches may actually be any type of networking device (e.g., a router) that is capable of routing packets. Thus, descriptions provided herein that use the term switch should be read according to this broader interpretation.

The switches of infrastructure layer 120 may be interconnected (e.g., with Ethernet cables or the like), creating various paths for packets to travel through the infrastructure layer. In this respect various computing devices may communicate with each other via infrastructure layer 120. As one example, network client 132 may communicate with storage volume 130 to access the storage resources of storage volume 130. In some examples, additional computing devices (e.g., additional storage volumes and additional network clients) may be connected to infrastructure layer 120. Network client 132 may be any server, computing device or the like that accesses other servers, storage volumes, computing devices or the like via a network. Storage volume 130 may be any storage system that contains at least one storage device (e.g., hard drive). For example, storage volume 130 may be a RAID (redundant array of independent disks) system with multiple spinning disk hard drives. As another example, storage volume 130 maybe a storage system with multiple optical drives or multiple tape drives. Multiple storage devices (e.g., hard drives) in a particular storage volume (e.g., 130) may be consolidated and presented to servers (e.g., network client 132) as at least one single logical storage unit.

In the example of FIG. 1, network client 132 and storage volume 130 may each be connected to at least one switch of infrastructure layer 120. Network client 132 and storage volume 130 may each be capable of supporting at least one Ethernet-based storage protocol such as FCoE, iSCSI, iSER/RoCE or the like. One benefit of the present disclosure is that basically any Ethernet-based storage protocol may be used between network client 132 and storage volume 130, and the switches of infrastructure later 120 may be able to handle the chosen protocol, e.g., with help from control layer 110.

Switches 122, 124, 126, 128 may each be controllable by an SDN controller (e.g., 116). Each switch may include at least one flow table that determines how packets are routed within the particular switch. Each switch may accept and interpret signals from the SDN controller to change values in the flow table(s). In this respect, the SDN controller may cause changes to occur in the flow tables of switches 122, 124, 126, 128, which may cause these switches to operate in various ways determined by the SDN controller. However, in order for the SDN controller to determine how to configure the switches, the switches may need to send the SDN controller information about which storage protocol is being used. This may be handled, at least in part, by the packet taggers (e.g., 123), as described in more detail below.

Switches 122, 124, 126, 128 may each include a packet tagger, as shown in FIG. 1. The following description will explain one example packet tagger 123 in switch 122, but it should be understood that the other switches of infrastructure layer 120 may operate in a similar manner.

Packet tagger 123 may tag certain incoming packets to switch 122 according to the particular storage protocol used (e.g., FCoE, iSCSI, iSER/RoCE, etc.). Then, packet tagger 123 may cause tagged packets to be sent to SDN controller 116. Packet tagger 123 may include a series of instructions encoded on a machine-readable storage medium and executable by a processor of switch 122. In addition or as an alternative, packet tagger 123 may include one or more hardware devices including electronic circuitry for implementing the functionality of the packet tagger described herein. In some examples, switch 122 may include a module (e.g., executable instructions and/or electronic circuitry) that is designed to support the ability of an SDN controller (e.g., 116) to configure how packets flow through switch 122. As such, in certain embodiments of the present disclosure packet tagger 123 may be an addition to this module.

Packet tagger 123 may tag certain packets, for example initialization packets or login packets. Various computing devices (e.g., storage volumes such as 130 and network clients such as 132) that attempt to communicate via infrastructure layer 120 may send an initialization or login packet to the particular switch that the computing device is connected to. The initialization or login packet may be an initial packet that is sent before substantive communications are sent. Packet tagger 123 may detect these initialization or login packets, and these packets may be used to configure the switch (e.g., with the help of control layer 110). These initialization packets may be protocol-specific (e.g., FCoE, iSCSI, iSER/RoCE, etc.), and thus packet tagger 123 and switch 122 may determine the particular storage protocol used before substantive communications are sent to the switch. The tag that packet tagger 123 adds to the packet may be referred to as a protocol tag. The protocol tag may indicate the protocol that was detected. Alternatively or in addition, the protocol tag may indicate which storage application (e.g., in 113) should handle the protocol specific tasks for the packet. More detailed description of storage applications 113 may be described below. Once packet tagger 123 tags a particular packet (e.g., an initialization packet), packet tagger 123 may cause switch 122 to send the packet to SDN controller 116, in which case, SDN controller may route the packet to the appropriate storage application (in 113).

Figure 2:
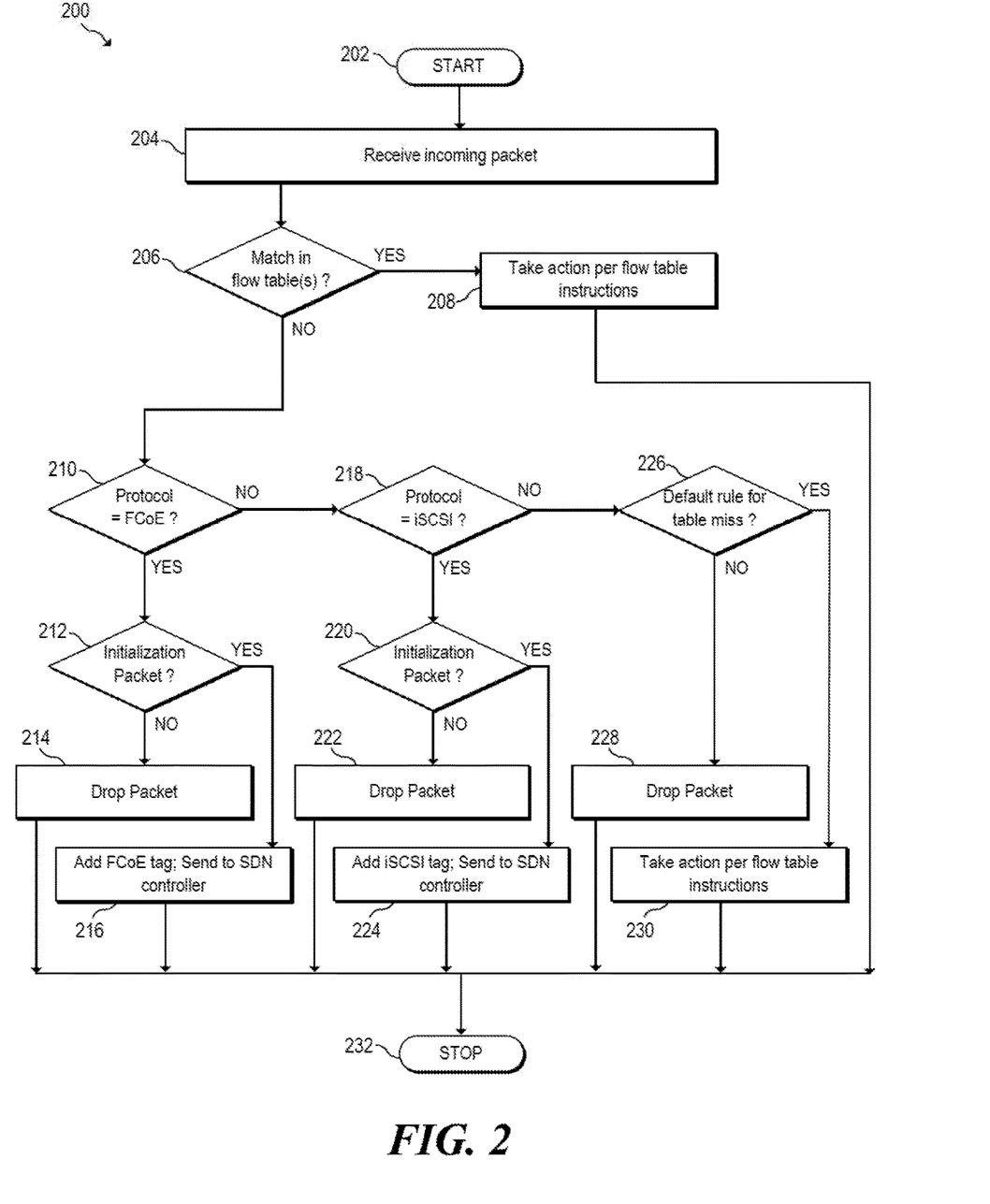
FIG. 2 is a flowchart of an example method for protocol agnostic storage access with a software defined network.

FIG. 2 is a flowchart of an example method 200 for protocol agnostic storage access with a software defined network (SDN). More specifically, method 200 may show how a switch (e.g., 122), in particular a packet tagger (e.g., 123), may tag certain incoming packets according to the particular storage protocol used and send such tagged packets to an SDN controller (e.g., 116). The execution of method 200 is described below with reference to a switch, which may be similar to switch 122 of FIG. 1, for example. In particular, method 200 may execute, at least partially, in a packet tagger (e.g., 123). Various other suitable networking devices may execute method 200 as well, for example, SDN enabled switch 600 of FIG. 6. Method 200 may be implemented in the form of executable instructions stored on a machine-readable storage medium, such as storage medium 620, and/or in the form of electronic circuitry. In alternate embodiments of the present disclosure, one or more blocks of method 200 may be executed substantially concurrently or in a different order than shown in FIG. 2. In alternate embodiments of the present disclosure, method 200 may include more or less blocks than are shown in FIG. 2. In some embodiments, one or more of the blocks of method 200 may, at certain times, be ongoing and/or may repeat.

Method 200 may start at block 202 and continue to block 204, where a switch (e.g., 122 of FIG. 1) in an infrastructure layer (e.g., 120) may receive an incoming packet (e.g., an initialization packet) from a connected computing device (e.g., a storage volume or a network client). At step 206, the switch may determine whether a match exists for the incoming packet in any flow tables of the switch. A switch may include multiple flow tables, so multiple flow tables may be checked at step 206. These are the flow tables that may be programmed at some point by an SDN controller (e.g., 116) to dictate how packets should flow through the switch. A flow table may include various conditions and then various actions for each condition. Each condition may match some piece of information (e.g., in the header of the packet) or some situation for a packet. For example, a condition may specify that the MAC address for the packet equals some value. If an incoming packet matches one of the conditions, the switch may take the actions that are associated with the condition in the table (at step 208). If an incoming packet does not match any of the conditions, method 200 may proceed to step 210.

At step 210, the switch may determine that the incoming packet is using a particular first storage protocol (e.g., FCoE). If the first protocol is being used, the switch may check whether the incoming packet is an initialization or login packet (at step 212). At step 214, if the packet is not an initialization packet, the switch may drop the packet. If method 200 arrives at step 214, that may indicate that an error has occurred because it may be the case that, ideally, non-initialization packets will experience a match at step 206 such that they are routed appropriately at step 208. If at step 212, the packet is an initialization packet, method 200 may proceed to step 216 where the switch may add a protocol tag for the first protocol (e.g., FCoE). This protocol tag may be added to the packet by changing data in the header of the packet, for example. Also at step 216, the switch may send the tagged packet to the SDN controller for further handling.

At step 218, the switch may determine that the incoming packet is using a particular second storage protocol (e.g., iSCSI). Then, steps 220, 222 and 224 may be similar in functionality to steps 212, 214 and 216, except that the second storage protocol is used instead of the first storage protocol. In some examples, method 200 may include any number of branches of steps similar to steps 212, 214, 216 and steps 220, 222, 224 for any number of protocols. In this respect, method 200 may be used to check whether an incoming packet is using any particular storage protocol, to check whether the incoming packet is an initialization packet and then to tag the packet appropriately.

Method 200 may arrive at step 226 if the incoming packet is not using any of the storage protocols that are detectable by the switch. At step 226, the switch may determine whether a default or generic rule exists for incoming packets that do not match any entries in any of the flow tables. If such a default rule does not exist, the packet may be dropped (step 228). If such a default rule does exist, the switch may take an associated action (at step 230). Method 200 may eventually continue to block 232, where method 200 may stop.

Referring again to FIG. 1, control layer 110 may include a SDN controller 116, a northbound API 114 and an application server 112. Control layer 110 may be at least one computing device. Thus, each of SDN controller 116, northbound API 114 and application server 112 may run on their own computing device and/or multiple of these may run on the same computing device. The term "system" may be used to refer to one computing device or multiple computing devices that are in communication to provide a unified service. Thus, control layer 110 may be implemented by a computing system that runs the SDN controller, the northbound API and the application server.

SDN controller 116 may communicate with the switches of infrastructure layer 120 to configure those switches. An SDN controller may be the "brain" of a software defined network, which may generally include the SDN controller, the switches and the appropriate connections. SDN controller 116 may determine how packets should flow through the switches of infrastructure layer 120, for example, by determining optimal network paths for traffic. SDN controller 116 may make these determinations automatically and/or with the input of a network administrator. In this respect, the SDN controller may facilitate automated network management, and may make it possible to control an entire network from a single console.

SDN controller 116 may use a southbound protocol or application programming interface (API), such as southbound API 118 to communicate with the switches of infrastructure layer 120. Southbound API 118 in FIG. 1 is shown as spanning between SDN controller 116 and the switches of infrastructure layer 120. This is because the SDN controller 116 and the switches may all need to support the southbound API. In general, the southbound API defines how the SDN controller 116 instructs the switches regarding how they should behave (e.g., how they should route packets). In other words, the southbound API defines a set of commands and signals by which the control plane (e.g., the SDN controller) can communicate with the data plane (e.g., the switches). Via this southbound API, the SDN controller can cause flow tables in the switches to change, which may cause packets entering the switches to route in specified ways. One example of a southbound API is OpenFlow; however, other southbound APIs may be used.

SDN controller 116 may include a series of instructions encoded on a machine-readable storage medium and executable by a processor of control layer 110. In addition or as an alternative, SDN controller 116 may include one or more hardware devices including electronic circuitry for implementing the functionality of the SDN controller described herein. SDN controller 116 may interface with at least one network interface of control layer 110. Via this at least one network interface, SDN controller 116 may connect (e.g., via Ethernet cables) to the switches of infrastructure layer 120.

SDN controller 116 may include a packet router 117. Packet router 117 may receive packets that are sent from various switches of infrastructure layer 120. These packets may include initialization packets that have been tagged (e.g., with protocol tags) by packet taggers of the switches. In response to receiving a particular tagged packet, packet router 117 may determine at least one storage application (e.g., 113) to route the packet to. Packet router 117 may make this determination based on the protocol tag of the packet. In some examples, packet router 117 may maintain a mapping between protocol tags and storage applications, and may reference this mapping in order to determine the storage application. As may be described in more detail below, application may run one application per storage protocol that is supported by network topology 100. Thus, packet router 117 may cause SDN controller 116 to route tagged packets to the appropriate storage application such that the storage application can perform protocol specific tasks.

SDN controller 116 may utilize a northbound API (e.g., 114). Northbound API may "sit on top" of SDN controller 116 and may provide a higher level construct that allows other applications to perform useful tasks via the controller. Northbound API 114 may be part of SDN controller 116, or it may be a separate component that communicates with SDN controller 116. Northbound API 114 may include a series of instructions encoded on a machine-readable storage medium and executable by a processor of control layer 110. In addition or as an alternative, northbound API 114 may include one or more hardware devices including electronic circuitry for implementing the functionality of the northbound API described herein.

Northbound API 114 may present abstractions to applications in application server 112 and to orchestration layer 102. As one example, northbound API 114 may present an abstraction of SDN controller 116 to applications in application server 112. As another example, northbound API 114 may present an abstraction of the infrastructure layer 120 to network orchestrator 104. In general, a northbound API may enable applications and orchestrators to program or configure a software defined network and to request or provision resources. Northbound API 114 may allow applications in application server 112 to communicate or integrate with SDN controller 116 using a standard protocol or standard commands. Without a northbound API, applications may have to be designed by the equipment vendors that create the SDN controller. Additionally, a northbound API allows network administrators to quickly modify or customizer their network resources.

Application server 112 may be a framework that provides the necessary environment (e.g., programming language, libraries, API's, etc.) for applications to run. Application server 112 may include a number of applications that run on or in the application server. These applications may include a number of storage applications, which are represented generally by box 113 in FIG. 1. Application server 112, and each of the applications (e.g., 113) that run in the application server, may include a series of instructions encoded on a machine-readable storage medium and executable by a processor of control layer 110. In addition or as an alternative, application server 112, and each of the applications (e.g., 113) that run in the application server, may include one or more hardware devices including electronic circuitry for implementing the described functionality.

The applications in application server 112 (e.g., storage applications 113) may each also be referred to as, or may include, a virtual application network (VAN). In general, VANs are used to define, up front, how an application may connect to a network. Instead of defining connectivity to a network using an iterative manual process, VANs are capable of providing access to a network of computing resources using a pre-defined method, protocol, structure or the like.

Storage applications 113 may include at least one storage application per storage protocol that network topology 100 supports. For example, one storage application may be related to a FC/FCoE storage protocol. Another storage application may be related to a iSCSI storage protocol. Yet another storage application may be related to a iSER/RoCE storage protocol. Each protocol specific storage protocol may provide storage-specific functionality. By providing these storage-specific protocols, network topology 100 allows for multiple storage protocols to run on top of the switches of infrastructure layer 120. In an ideal network topology, several storage protocols would be supported, for example, the most commonly used storage protocols. In this case, a network administrator may be confident that any storage protocol used may be supported by the network topology. Thus, the network topology may be said to provide protocol agnostic storage access.

As described above, each of these storage applications may run on or interface with SDN controller 116 via northbound API 114. Via northbound API 114, storage applications 113 may receive packets from SDN controller 116. For example, a first storage application related to a first storage protocol may receive packets (e.g., initialization packets) from SDN controller 116 that use the first storage protocol. Thus, each storage application receives packets that use the storage protocol specific to the particular storage application. Various descriptions below may describe how one protocol-specific storage application may handle storage-specific packets that are sent to it by SDN controller 116; however, it should be understood that other protocol-specific storage applications may function in a similar manner.

When each storage application (in 113) receives a storage-specific packet, the storage application may perform protocol-specific tasks. For example, when a first storage application related to a first storage protocol receives a packet that uses the first storage protocol, the first storage application may perform tasks on the packet that are related to the first storage protocol. For example, the first storage protocol may perform translations and/or may determine SDN controller instructions that are related to the first storage protocol. In other words, the first storage application may determine certain initialization tasks that need to be performed, and the first storage application may be able to make such determinations because it is designed to interpret initialization packets that use the first storage protocol.

When each storage application (in 113) has performed protocol-specific tasks in response to receiving a storage-specific packet, the storage application may then send instructions to SDN controller 116 that indicate how SDN controller 116 may configure the switches (e.g., configure their flow tables) of infrastructure layer 120. For example, a first storage application related to a first storage protocol may send instructions to SDN controller 116 to allow the switches of infrastructure layer 120 to route subsequent packets of the first storage protocol. Once the switches of infrastructure layer are configured for a particular storage protocol, subsequent packets of that protocol may route through infrastructure layer 120 without additional help from storage application 113 (e.g., unless a new initialization packet is received).

Figure 3:
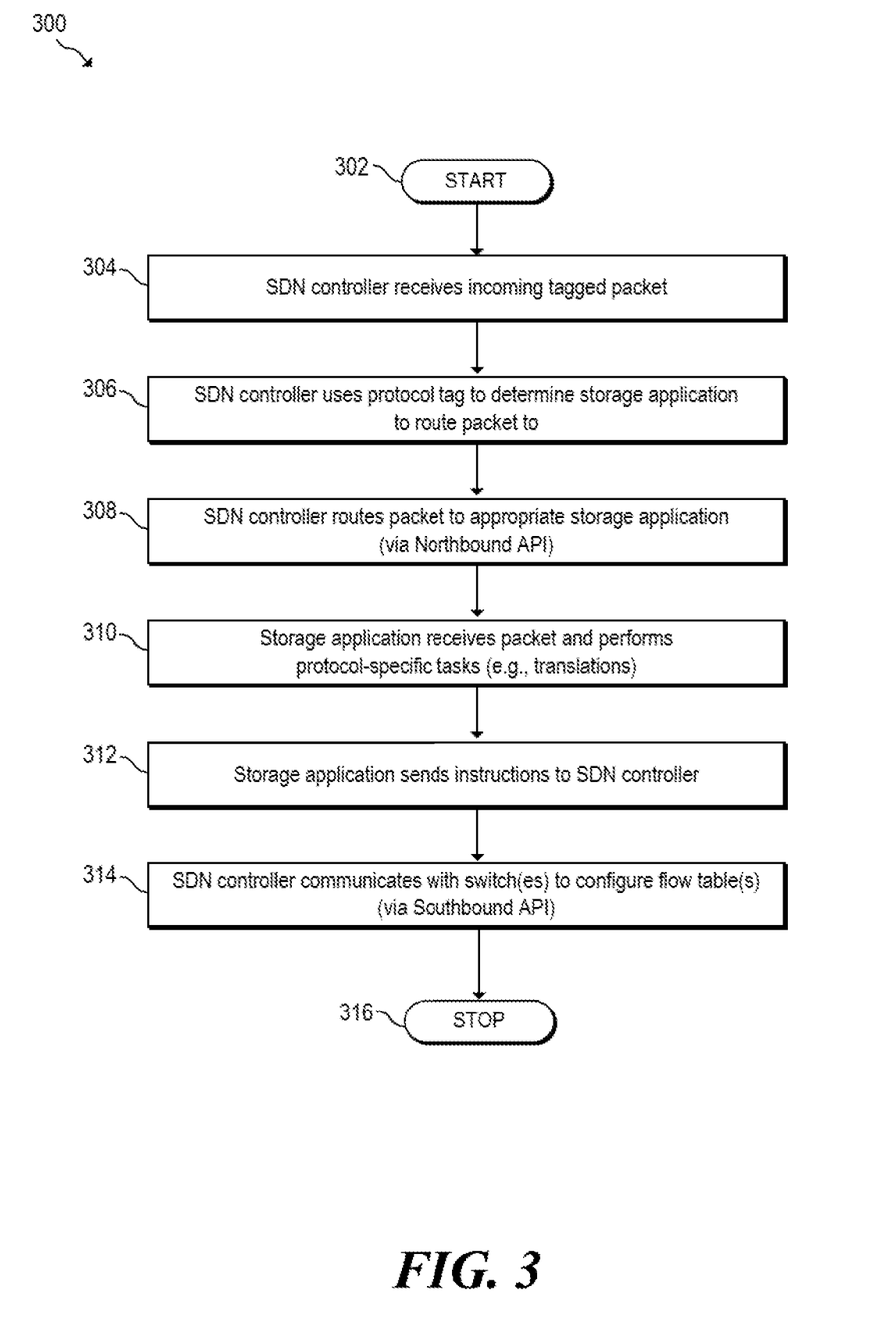
FIG. 3 is a flowchart of an example method for protocol agnostic storage access with a software defined network.

FIG. 3 is a flowchart of an example method 300 for protocol agnostic storage access with a software defined network (SDN). More specifically, method 300 may show how an SDN controller (e.g., 116) may receive tagged packets, forward such packets to protocol-specific storage applications, and ultimately configure switches of the infrastructure layer appropriately. The execution of method 300 is described below with reference to a control layer, which may be similar to control layer 110 of FIG. 1, for example. In particular, method 300 may execute at least partially in a SDN controller (e.g., 116) and at least partially in at least one storage application (e.g., 113). Various other suitable computing devices may execute method 300 as well, for example, SDN controller 520 and application server 510 of FIG. 5. Method 300 may be implemented in the form of executable instructions stored on at least one machine-readable storage medium and executed by at least one processor of the control layer, and/or in the form of electronic circuitry. In alternate embodiments of the present disclosure, one or more blocks of method 300 may be executed substantially concurrently or in a different order than shown in FIG. 3. In alternate embodiments of the present disclosure, method 300 may include more or less blocks than are shown in FIG. 3. In some embodiments, one or more of the blocks of method 300 may, at certain times, be ongoing and/or may repeat.

Method 300 may start at block 302 and continue to block 304, where a SDN controller (e.g., in a control layer) may receive an incoming tagged packet. Such a packet may have been tagged with a protocol tag by a switch of the infrastructure layer. At step 306, the SDN controller may use the protocol tag to determine which of several storage applications to route the packet to. At step 308, the SDN controller may route the packet to the appropriate storage application (e.g., via a northbound API). At step 310, the appropriate storage application (e.g., in the control layer) may receive the packet and may perform protocol-specific tasks (e.g., translations, determination of SDN controller instructions, etc.). At step 312, the storage application may send instructions to the SDN controller to cause the SDN controller to properly configure switches of the infrastructure layer. At step 314, the SDN controller may communicate with at least one switch of the infrastructure layer to configure at least one flow table of the switch(es). Such configuration may be performed via a southbound API (e.g., OpenFlow). Method 300 may eventually continue to block 316, where method 300 may stop.

Referring again to FIG. 1, orchestration layer 102 may include at least one network orchestrator 104, also referred to as an orchestration tool or a cloud orchestrator. Orchestration layer 102 may be at least one computing device. Thus, network orchestrator 104 may run on such an orchestration layer computing device. In some examples, network orchestrator 104 may run on a computing device that runs other components of network topology 100, for example, on a computing device that runs at least one component of control layer 110. The term "system" may be used to refer to one computing device or multiple computing devices that are in communication to provide a unified service. Thus, it may be said that network orchestrator 104 is part of the same system as the components of control layer 110, and this may mean that network orchestrator is run on the same computing device as those components or on a different but connected computing device.

Network orchestrator 104 may "sit on top" of northbound API 114 and SDN controller 116, and network orchestrator 104 may communicate or interface with SDN controller 116 via northbound API 114. Network orchestrator 104 may provide (e.g., as abstractions) various resources (e.g., networking resources from infrastructure layer 120 and/or storage resources such as storage volume 130) in network topology 100 to orchestrator clients (e.g., 106). Network orchestrator 104 may provide a dashboard of sorts to clients (e.g., administrators) that allows the clients to provision, set up and manage resources of network topology 100, e.g., through a web interface. OpenStack is one example of a network orchestrator; however, it should be understood that other network orchestrators may be used.

Network orchestrator 104 may be supported by control layer 110. This may mean that control layer 110 provides abstractions and standards that allow network orchestrator 104 to easily configure infrastructure layer 120.

Figure 4:
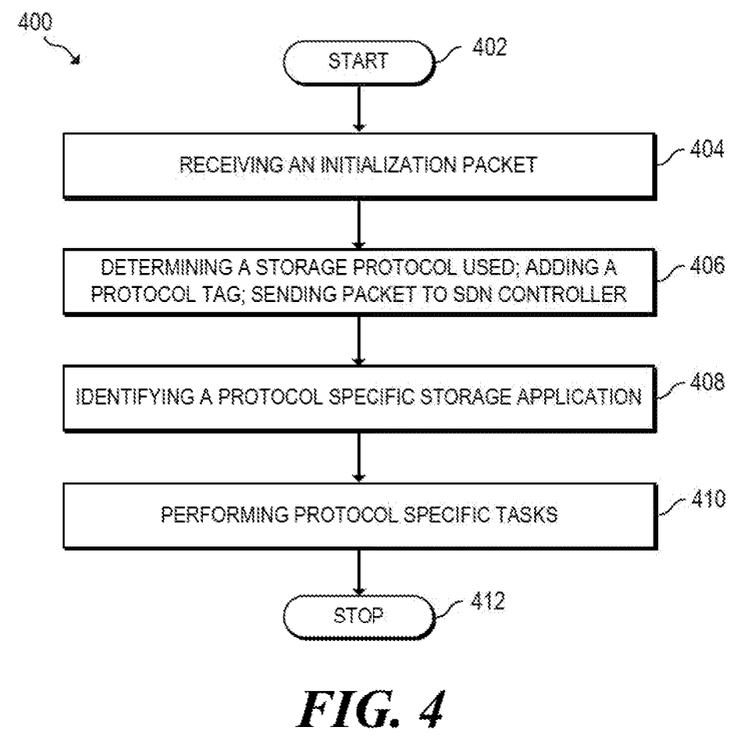
FIG. 4 is a flowchart of an example method for protocol agnostic storage access with a software defined network.

FIG. 4 is a flowchart of an example method 400 for protocol agnostic storage access with a software defined network (SDN). Method 400 may be described below as being executed or performed by a networking system, for example, networking system 500 of FIG. 5. Other suitable networking systems may be used as well, for example, networking topology 100 of FIG. 1. Method 400 may be implemented in the form of executable instructions stored on at least one machine-readable storage medium of the networking system (e.g., 500), and/or in the form of electronic circuitry. In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Figure 5:
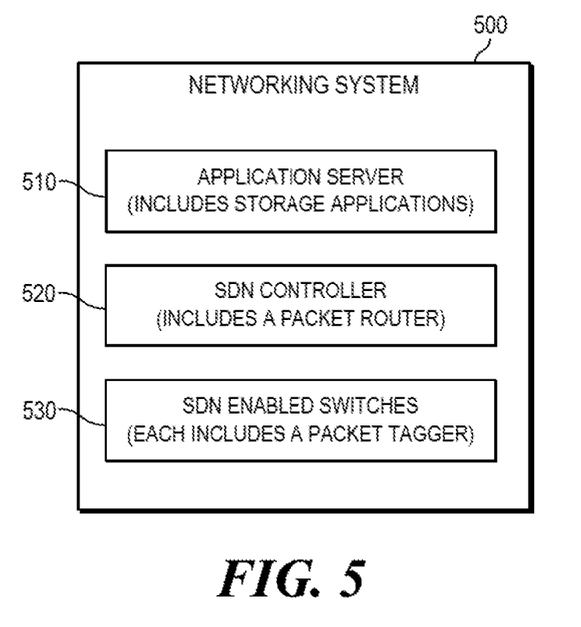
FIG. 5 is a block diagram of an example networking system for protocol agnostic storage access with a software defined network.

Method 400 may start at step 402 and continue to step 404, where a networking system (e.g., 500) may receive, at a software defined network (SDN) enabled switch (e.g., in 530), an initialization packet to access a storage volume. At step 406, the networking system may determine, at the SDN enabled switch, a storage protocol used by the initialization packet, and may add a protocol tag indicative of the storage protocol to the initialization packet. Furthermore, the networking system may send the initialization packet to a SDN controller (e.g., 520). At step 408, the networking system may identify, at the SDN controller, a storage application based on the protocol tag and may send the initialization packet to the storage application (e.g., running on application server 510). The storage application may be one of a plurality of storage applications, each associated with a different storage protocol. At step 410, the networking system may perform, by the storage application, protocol-specific tasks. Method 400 may eventually continue to step 412, where method 400 may stop.

FIG. 5 is a block diagram of an example networking system 500 for protocol agnostic storage access with a software defined network (SDN). Networking system 500 may be similar to network topology 100 of FIG. 1, for example. Networking system 500 may be an arrangement of physical computing elements (e.g., network infrastructure elements, network control elements and network orchestration elements). Networking system 500 may include at least one computing device and at least one networking device. In the embodiment of FIG. 5, networking system 500 includes at least one SDN enabled switch 530 (e.g., similar to switches 122, 124, 126, 128 of FIG. 1), an SDN controller 520 (e.g., similar to SDN controller 116) and an application server 510 (e.g., similar to 112).

Networking system 500 may include at least one software defined network (SDN) enabled switch 530. Each switch may include a packet tagger to tag incoming initialization packets with a protocol tag indicative of a storage protocol used by the particular initialization packet. Networking system 500 may include an SDN controller 520 that includes a packet router to receive initialization packets from the plurality of SDN enabled switches. The packet router may route the initialization packets to appropriate storage applications based on the protocol tag of each initialization packet. Networking system 500 may include an application server 510 that includes a plurality of storage applications that are capable of communicating with the SDN controller. Each storage application may be associated with a different storage protocol and capable of performing protocol-specific tasks based on received initialization packets.

Figure 6:
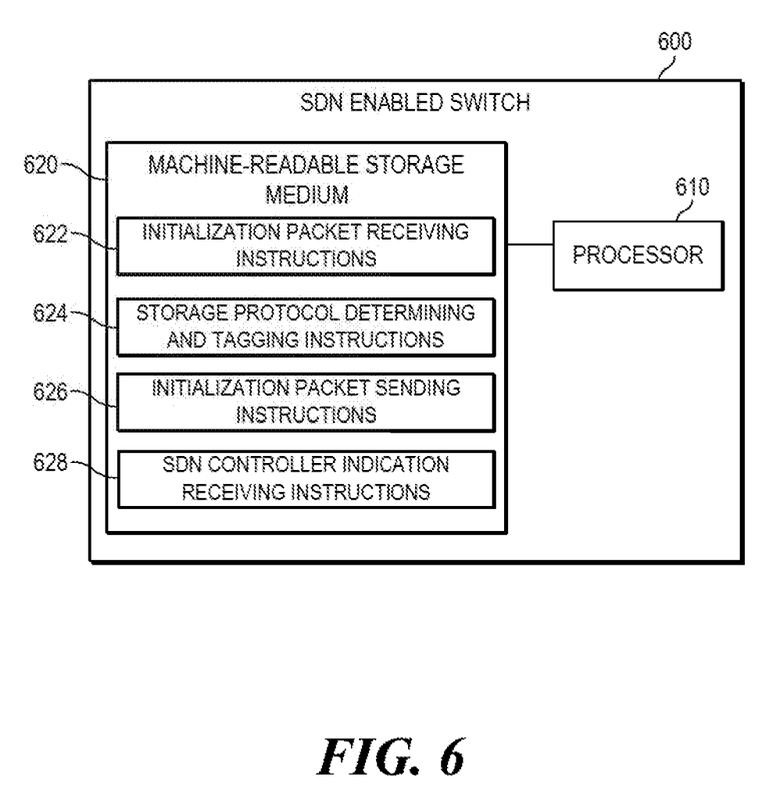
FIG. 6 is a block diagram of an example software defined network enabled switch for protocol agnostic storage access with a software defined network.

FIG. 6 is a block diagram of an example SDN enabled switch 600 for protocol agnostic storage access with a software defined network (SDN). SDN enabled switch 600 may be part of a networking topology or networking system (e.g., similar to 500 of FIG. 5 or 100 of FIG. 1). SDN enabled switch 600 may be any computing device or networking device that is capable of being configured regarding how to route packets. More details regarding an example SDN enabled switch may be described above, for example, with respect to switch 122 of FIG. 1 and/or SDN enabled switches 530 of FIG. 5. In the embodiment of FIG. 6, SDN enabled switch 600 includes a processor 610 and a machine-readable storage medium 620.

Processor 610 may be one or more central processing units (CPUs), microprocessors, and/or other hardware devices suitable for retrieval and execution of instructions stored in machine-readable storage medium 620. In the particular embodiment shown in FIG. 6, processor 610 may fetch, decode, and execute instructions 622, 624, 626, 628 to facilitate protocol agnostic storage access with a software defined network (SDN). As an alternative or in addition to retrieving and executing instructions, processor 610 may include one or more electronic circuits comprising a number of electronic components for performing the functionality of one or more of instructions in machine-readable storage medium 620. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within SDN enabled switch 600, as shown in FIG. 6. In this situation, the executable instructions may be "installed" on the switch 600. Alternatively, machine-readable storage medium 620 may be a portable (e.g., external) storage medium, for example, that allows SDN enabled switch 600 to remotely execute the instructions or download the instructions from the storage medium. In this situation, the executable instructions may be part of an "installation package". As described herein, machine-readable storage medium 620 may be encoded with executable instructions for protocol agnostic storage access with a software defined network (SDN).

In an SDN enabled switch (e.g., 530), initialization packet receiving instructions, when executed by processor 610, may receive an initialization packet to access a storage volume (e.g., 130 of FIG. 1). Storage protocol determining and tagging instructions, when executed by processor 610, may determine a storage protocol used by the initialization packet and add a protocol tag indicative of the storage protocol to the initialization packet. Initialization packet sending instructions, when executed by processor 610, may send the initialization packet to a SDN controller (e.g., 520) such that the SDN controller can route the packet based on the protocol tag to a storage application (e.g., in application server 510). The storage application may be associated with the storage protocol and performs protocol-specific tasks. SDN controller indication receiving instructions, when executed by processor 610, may receive, from the SDN controller, indications of how the SDN enabled switch should configure flow tables of the switch to route subsequently received packets associated with the storage protocol. The indications from the SDN controller may be based on the protocol-specific tasks of the storage application.

The invention claimed is:

1. A method for protocol agnostic storage access in a software defined network topology, the method comprising:
receiving, at a software defined network (SDN) enabled switch, an initialization packet to access a storage volume;
at the SDN enabled switch, determining a storage protocol used by the initialization packet to access the storage volume;
adding a protocol tag indicative of the determined storage protocol to the initialization packet; and
sending the initialization packet with the added protocol tag to a SDN controller; at the SDN controller, receiving the initialization packet with the added protocol tag from the SDN enabled switch;
identifying a storage application that is to perform protocol-specific tasks based on the protocol tag in the received initialization packet; and
sending the received initialization packet to the identified storage application, wherein the identified storage application is one of a plurality of storage applications, each of the plurality of storage applications being associated with a different storage protocol; and
performing, by the identified storage application, the protocol-specific tasks.

2. The method of claim 1, further comprising configuring, by the SDN controller, the SDN enabled switch based on the protocol-specific tasks performed by the storage application.

3. The method of claim 2, wherein the configuration specifies how the SDN enabled switch is to route subsequent packets that use the storage protocol.

4. The method of claim 2, further comprising: receiving, at the SDN enabled switch, a subsequent packet that uses the storage protocol; determining, by the SDN enabled switch, that the subsequent packet matches at least one flow table of the switch; and routing, by the SDN enabled switch, the subsequent packet based on the flow table, wherein the configuration caused the matching of the at least one flow table and the routing based on the flow table.

5. The method of claim 1, wherein the protocol-specific tasks include making determinations of how packets should be routed according to the storage protocol.

6. The method of claim 1, wherein the storage protocol is one of FCoE, iSCSI and iSER/RoCE, and wherein the storage application is associated with that storage protocol, and wherein the other storage applications of the plurality of storage applications are each associated with a different storage protocol.

7. The method of claim 1, wherein sending the initialization packet to the storage application is performed via a northbound application programming interface (API).

8. The method of claim 2, wherein the configuring of the SDN enabled switch is performed via a southbound application programming interface (API).

9. A networking system, comprising:
a plurality of software defined network (SDN) enabled switches, each switch of the plurality of SDN enabled switches including a processor and a non-transitory storage medium storing instructions, the instructions executable by the processor to tag incoming initialization packets with a protocol tag indicative of a storage protocol used by the particular initialization packet;

an SDN controller that includes a packet router to:

receive the tagged initialization packets from the plurality of SDN enabled switches;

identify, based on the protocol tags in the received tagged initialization packets, respective storage applications that are to perform protocol-specific tasks; and route the tagged initialization packets to the identified respective storage applications; and an application server that includes the storage applications, each storage application being associated with a different storage protocol and to perform protocol-specific tasks based on received tagged initialization packets.

10. The networking system of claim 9, wherein the SDN controller further includes a northbound application programming interface (API) that allows the plurality of storage applications to communicate with the SDN controller.

11. The networking system of claim 9, wherein the protocol-specific tasks include indicating to the SDN controller how packets should flow through the plurality of SDN enabled switches for the particular storage protocol associated with the particular storage application.

12. The networking system of claim 9, wherein the SDN controller is further to receive indications from the plurality of storage applications regarding how to configure the plurality of SDN enabled switches, wherein such indications are based on protocol- specific tasks performed by the plurality of storage applications.

13. A non-transitory machine-readable storage medium encoded with instructions executable by a processor of a software defined network (SDN) enabled switch, wherein the instructions, when executed by the processor, cause the switch to: receive an initialization packet to access a storage volume; determine a storage protocol used by the initialization packet; add a protocol tag indicative of the storage protocol to the initialization packet; send the initialization packet with the added protocol tag to a SDN controller, wherein the SDN controller is to route the initialization packet based on the protocol tag to a storage application, wherein the storage application is associated with the storage protocol and performs protocol-specific tasks; and receive, from the SDN controller, indications of how the SDN enabled switch should configure flow tables of the switch to route subsequently received packets associated with the storage protocol, wherein the indications from the SDN controller are based on the protocol- specific tasks of the storage application.

14. The machine-readable storage medium of claim 13, wherein the storage application is one of a plurality of storage applications, wherein each storage application is associated with a different storage protocol.

15. The machine-readable storage medium of claim 13, wherein the indications of how the SDN enabled switch should configure the flow tables is based on the OpenFlow protocol.

16. The machine-readable storage medium of claim 13, wherein the instructions, when executed by the processor, are further to cause the switch to route the initialization packet via a northbound application programming interface (API).

17. The machine-readable storage medium of claim 13, wherein the SDN controller is to configure the SDN enabled switch via a southbound application programming interface (API) and based on the protocol-specific tasks of the storage application.

18. The networking system of claim 9, wherein the SDN controller is to route the initialization packets via a northbound application programming interface (API).

19. The networking system of claim 9, wherein the SDN controller is to configure the plurality of SDN enabled switches based on the protocol-specific tasks performed by the storage applications.

20. The networking system of claim 9, wherein the SDN controller is to configure the plurality of SDN enabled switches via a southbound application programming interface (API).

* * * * *